United States Patent [19]

Sjölinder

[11] Patent Number: 5,050,955

[45] Date of Patent: Sep. 24, 1991

[54] FIBREOPTIC SWITCH

[75] Inventor: Sven R. Sjölinder, Stockholm, Sweden

[73] Assignee: Telefonaktiebolaget L M Ericsson, Stockholm, Sweden

[21] Appl. No.: 619,424

[22] Filed: Nov. 29, 1990

[30] Foreign Application Priority Data

Dec. 21, 1989 [SE] Sweden .............................. 8904324

[51] Int. Cl.$^5$ .............................................. G02B 6/26
[52] U.S. Cl. ....................................... 385/17; 385/20; 385/24
[58] Field of Search ............... 350/96.11, 96.12, 96.13, 350/96.14, 96.15, 96.16, 96.20, 96.21, 96.22

[56] References Cited

U.S. PATENT DOCUMENTS

| | | | |
|---|---|---|---|
| 4,193,662 | 3/1980 | Hara | 350/96.15 |
| 4,220,396 | 9/1980 | Antell | 350/96.15 |
| 4,312,561 | 1/1982 | Mead | 350/96.21 |
| 4,322,126 | 5/1982 | Minowa et al. | 350/96.20 |
| 4,407,562 | 10/1983 | Young | 350/96.20 |
| 4,512,627 | 4/1985 | Archer et al. | 350/96.20 |
| 4,653,849 | 3/1987 | Boirat et al. | 350/96.22 |
| 4,653,850 | 3/1987 | Boirat et al. | 350/96.22 |
| 4,886,335 | 12/1989 | Yanagawa et al. | 350/96.20 |

FOREIGN PATENT DOCUMENTS

| | | | |
|---|---|---|---|
| 3127574 | 4/1983 | Fed. Rep. of Germany ... | 350/96.13 X |
| 58-68702 | 4/1983 | Japan | 350/96.13 X |
| 63-124013 | 5/1988 | Japan | 350/96.13 X |

Primary Examiner—Brian Healy
Attorney, Agent, or Firm—Burns, Doane, Swecker & Mathis

[57] ABSTRACT

The present invention relates to a fibreoptic switch for enabling one or more of n number of incoming optofibers to be connected selectively with a respective one of m number of outgoing optofibers. According to the invention, the switch includes a matrix block (1) having light transmitting devices (2) which extend in n number of rows and m number of columns between an input side and an output side. On the input side, the incoming optofibers (3) can be displaced linearly along a respective row of the rows of light transmitting devices (2), and the outgoing optofibers (6) on the output side can be displaced linearly along a respective column of the columns of light transmitting devices (2). A selected incoming optofibre (3) can therewith be displaced along its corresponding row to a desired column of light transmitting devices (2), and an outgoing optofiber (6) in a corresponding column can be displaced to a corresponding row of light transmitting devices (2), so as to mutually connect the selected optofibers.

7 Claims, 2 Drawing Sheets

FIBREOPTIC SWITCH

TECHNICAL FIELD

The present invention relates to a fiberoptic switch which will enable one or more of an n number of incoming optofibers to be connected with a respective one of an m number of outgoing optofibers.

PRIOR ART

A switch affords a possibility of disposing connections in an ordered array. In the case of opto techniques, the connections consist of optofibers. Manual installation of these fibers in the absence of any ordered lay-out will ultimately result in an unbelievable bundle of tangled fibers which is almost impossible to unravel or which requires expensive de-installation. Attempts have been made to provide mechanical solutions which will overcome these problems. One solution has been to arrange incoming and outgoing optofibers perpendicularly to one another in one plane, and to mount raisable and lowerable mirrors or like light deflecting devices at the points at which the fiber axes intersect one another. The drawback with this solution is that it requires the provision of many optical components of high precision. Attenuation in signal transmission is also high.

Other solutions attempted with switches of this kind have included arranging the incoming and outgoing optofibers in a matrix system. The switch includes a plurality of optical dividers each connected to a respective incoming optofiber, a plurality of optical switches disposed at the matrix intersection points, and a plurality of optical combiners each connected to a respective outgoing optifiber. Each switch includes an optoelectric element, an amplifier and an electrooptic element. Because of the large number of structural components involved, a switch of this kind is expensive and complicated, particularly in the case of large switchs affording many coupling possibilities. The switch also requires a continuous supply of current.

DISCLOSURE OF THE INVENTION

The object of the present invention is to avoid the drawbacks of known switchs by providing an optical switch which is inexpensive and reliable and to which current need only be supplied when a change-over is made, and which is of simple construction. This object is achieved with a switch which includes a matrix block provided with light transmission devices which extend in an n number of rows and m number of columns between an input side and an output side, and in that the incoming optofibers on the input side are each displaceable linearly along a respective row of light transmission devices and the outgoing optofibers on the output side are each displaceable linearly along a respective column of light transmission devices. This arrangement enables incoming optofibers to be displaced respectively along their corresponding rows to a desired column of light transmission devices and an outgoing optofiber in a corresponding column to be displaced to a corresponding row of light transmission devices for mutual connection of the selected optofibers.

The light transmission devices are preferably waveguides, optical fibers or the like. The incoming and outgoing optofibers are advantageously arranged on slides or like devices capable of being displaced in corresponding guide grooves in the matrix block, said light transmission devices terminating in the bottoms of respective guide grooves.

Each slide will preferably include a spring-biased ball capable of engaging a recess provided in each guide groove and corresponding to each row and column of light transmission devices respectively, so as to enable respective optofibers to be set to their correct positions.

An advantage is afforded when the slides can be moved in the guide grooves with the aid of stepping motors or the like, and, when seen in cross section, the slides will preferably have a trapezoidal configuration with the trapezium base facing towards the matrix block. The guide grooves are correspondingly configured and the optofibers terminate in the base of the trapezoidal slides.

An optical switch constructed in accordance with the invention provides several advantages. One advantage is that there is no need to directly remount the connections, i.e. the optofibers, thereby avoiding tangles. The particular arrangement of a matrix enables the maximum number of coupling possibilities to be obtained, i.e. the maximum possible number of combinations between inputs and outputs.

The use of a wave conductor, optical fiber or the like as the light transmission devices affords the advantage that low attenuation can be achieved in all set-ups.

Because the optofibers are disposed on slides or the like capable of being displaced in corresponding guide grooves in the matrix blocks, there is obtained a very simple mechanical construction. The provision on each slide of a spring-biased ball, which can engage in a recess formed in each guide groove and corresponding to each row and column of light transmitting devices respectively, affords the advantage of enabling respective optofibers to be positioned very accurately.

Because the slides can be displaced in the guide grooves with the aid of stepping motors or the like, and because the slides have a trapezoidal cross-section with the base facing towards the matrix block and because the guide grooves have a corresponding configuration, the optofibers can be accurately positioned with the aid of simple means and the mechanical construction is reliable. No separate means are required to hold the slides in position on the matrix block.

The invention will now be described in more detail with reference to an exemplifying embodiment thereof and with reference to the accompanying drawings.

BEST MODE FOR CARRYING OUT THE INVENTION

Figure 1:
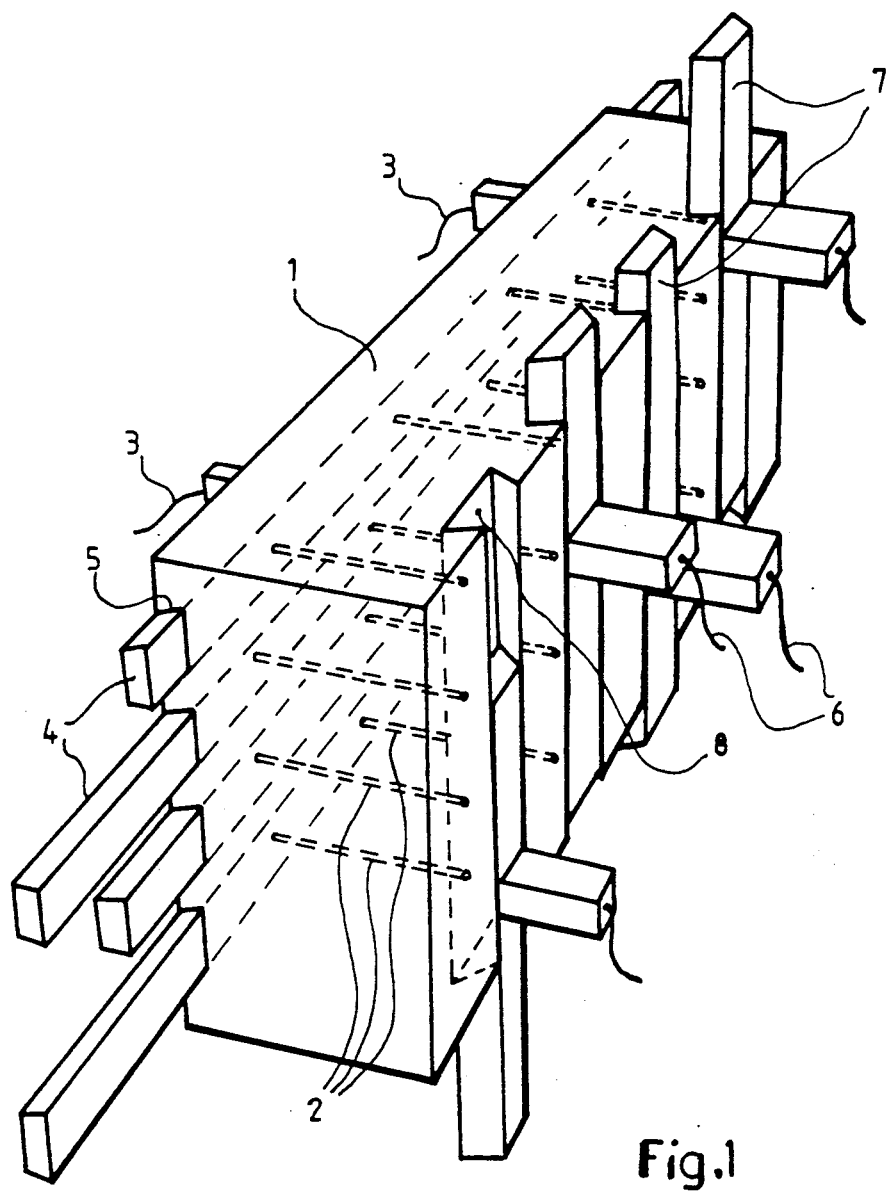
FIG. 1 is a perspective view of a preferred embodiment of an inventive optical switch.

FIG. 1 illustrates in perspective a preferred embodiment of an inventive optical switch. The switch includes a matrix block 1 having a plurality of light transmission devices 2 which are arranged in n number of rows and m number of columns. For the sake of illustration, only four rows and four columns have been shown on the drawing, although it will be understood that any number of rows and columns may be provided and that the number of rows and columns is only restricted by the size of the switch and by what can be considered reasonable from the aspect of construction. Neither need the rows and columns be of mutually equal numbers, as in the case of the illustrated embodiment, but can be varied independently of one another. The light transmission devices 2 extend through the matrix block 1 from an input side to an output side and consist of waveguides, optical fibers or simply of a hole which extends through the matrix block, provided that the block is narrow.

The incoming optifibers 3 on the input side are arranged on slides 4 which are inserted in guide grooves 5 in the matrix block 1 and which can be displaced therealong. The guide grooves 5 are disposed so that each of said grooves will extend along a respective row of the n number of rows of light transmitting devices 2, with the light transmitting devices terminating in the bottom of respective grooves 5. Similarly, the outgoing optofibers 6 on the output side are disposed on slides 7, which are inserted in guide grooves 8 in the matrix block 1 and can be displaced therealong. The grooves 8 are disposed perpendicularly to the grooves 5 and each of the grooves 8 extends along a respective column of the m number of columns of light transmitting devices 2, and the light transmitting devices terminate in the bottom of respective grooves 8. When seen in cross-section, the slides 4 and 7 have a trapezoidal configuration, with the base of the trapezium facing towards the matrix block 1. The guide grooves 5 and 8 have a corresponding configuration, so as to guide and hold the slides positively in the matrix block. Both the incoming and outgoing optofibers 3 and 6 are therewith terminated in the base of the trapezoidal slides.

The aforedescribed arrangement enables connections to be made selectively between the incoming and outgoing optofibers. For instance, the incoming optofiber in row 1 can be moved to the third column and the outgoing optofiber in column 3 can be moved to row 1, so as to connect these two optofibers together. Similarly, remaining optofibers can be moved selectively to desired rows and columns respectively, so as to establish the desired connections.

Figure 2:
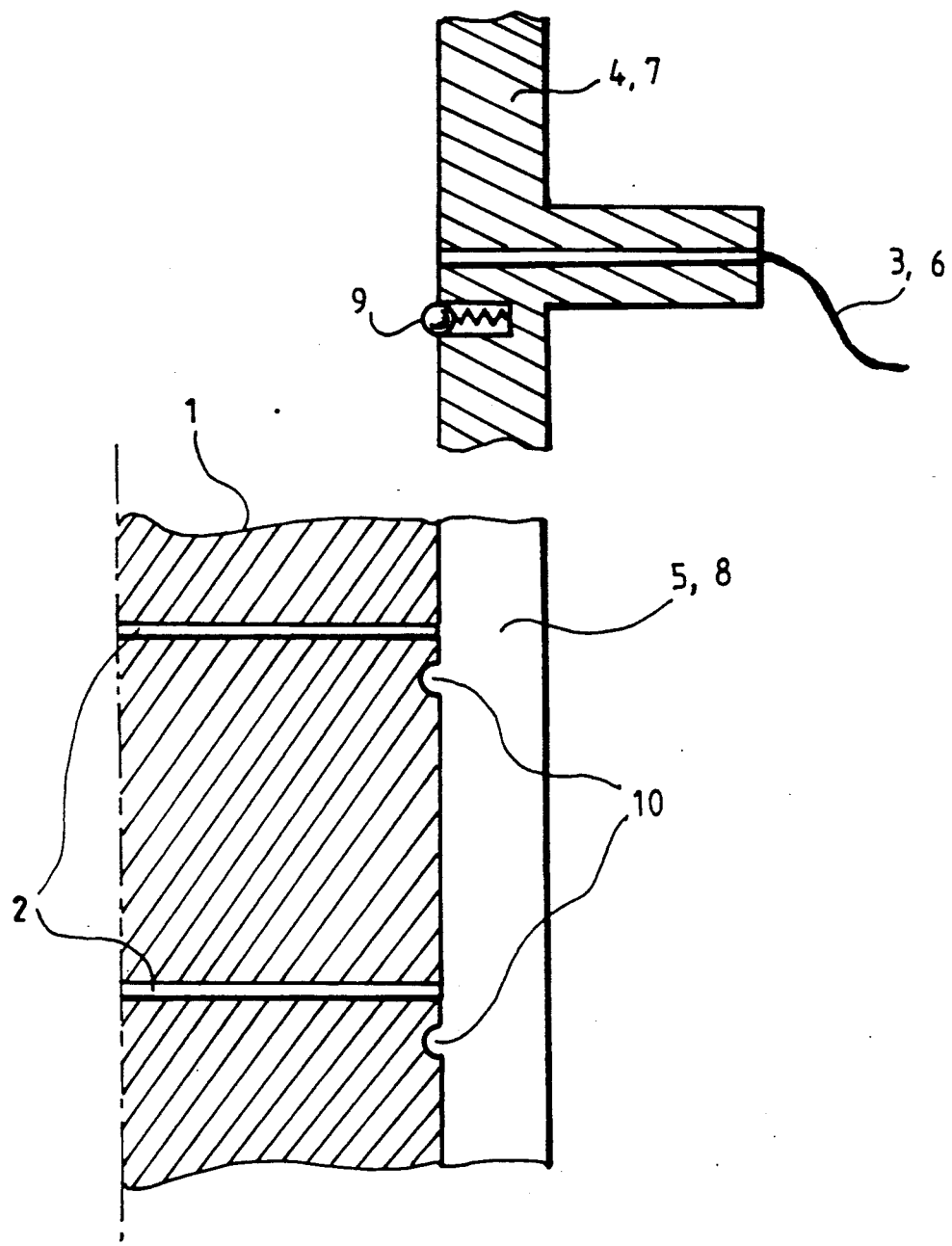
FIG. 2 is a sectional view of one part of the switch illustrated in FIG. 1.

Movement of the slides, and therewith of the optofibers, to the desired rows and columns can be effected with the aid of stepping motors or the like (not shown) which drive the slides. In order to ensure that the correct setting is obtained, each slide 4 or 7 is provided with a spring-biased ball 9 in the base of the slide, immediately adjacent the optofiber, as illustrated in FIG. 2, which is a sectional view of part of a guide groove 5 or 8 in the matrix block and a part of a corresponding slide 4 or 7. Each guide groove 5 or 8 is provided with corresponding recesses 10 in which the spring-biased ball 9 can engage and which are located immediately adjacent the mouths of the light transmission devices 2. This arrangement enables movement of respective slides to be accurately controlled, so that the optofiber and the light transmitting device will be in alignment with one another, therewith to achieve the best possible light transmission and the smallest possible attenuation.

It will be understood that the aforesaid optofibers, both the incoming and the outgoing fibers, may also include groups of optofibers, such as band fiber cable having, for instance, eight fibers, in which case each incoming fiber group can be connected to an outgoing optofiber group.

It will also be understood that the invention is not restricted to the aforedescribed and illustrated embodiment, and that modifications can be made within the scope of the following Claims.

I claim:

1. A fiberoptic switch for enabling selective connection of one or more of an n number of incoming optofibers with a respective one of an m number of outgoing optofibers, characterized in that the switch includes a matrix block having light transmission devices which extend in n number of rows and m number of columns between an input side and an output side; in that the incoming optofibers on the input side are each displaceable linearly along a respective row of the rows of light transmission devices; in that the outgoing optofibers on the output side are displaceable linearly along a respective column of the columns of light transmitting devices; and in that a selected incoming optofiber can be displaced along its corresponding row to a desired column of light transmitting devices and an outgoing optofiber in a corresponding column can be displaced to a corresponding row of light transmitting devices for mutual connection of the selected optofibers.

2. A switch according to claim 1, characterized in that the light transmission devices are wavelengths, optical fibers or the like.

3. A switch according to claim 2, characterized in that both the incoming and outgoing optofibers are arranged on slides or corresponding devices which can be displaced in corresponding guide grooves in the matrix block; and in that the light transmitting devices terminate in the bottom of the guide grooves.

4. A switch according to claim 3, characterized in that each slide includes a spring-biased ball which can engage in a recess provided in each guide groove and corresponding to each row and column respectively of light transmitting devices, for placing respective optifibers in their correct positions.

5. A switch according to claim 3, characterized in that the slides have a trapezoidal configuration with the base facing towards the matrix block and in that the guide grooves have a corresponding configuration.

6. A switch according to claim 3, characterized in that in cross-section the slides have a trapezoidal configuration with the base facing towards the matrix block and in that the guide grooves have a corresponding configuration.

7. A switch according to claim 6, characterized in that the optofibers exit in the base of the trapezoidal slides.

* * * * *